United States Patent [19]

Jorgenson

[11] 4,273,352
[45] Jun. 16, 1981

[54] COMBINATION PUSH AND TOW BAR

[76] Inventor: Lyle A. Jorgenson, 7420 S. 1025 E., South Weber, Utah 84403

[21] Appl. No.: 58,419

[22] Filed: Jul. 18, 1979

[51] Int. Cl.³ .......................... B60D 1/06; B60D 3/00
[52] U.S. Cl. ................................ 280/481; 280/491 B; 293/117
[58] Field of Search ........... 280/491 R, 491 B, 491 D, 280/491 A, 491 C, 491 E, 481, 498, 499, 492, 493, 401, 402; 293/117

[56] References Cited

U.S. PATENT DOCUMENTS

| | | | |
|---|---|---|---|
| 2,378,504 | 6/1945 | Roos | 280/491 B |
| 2,880,016 | 3/1959 | Peterson | 280/491 B |
| 3,287,027 | 11/1966 | Schuckman | 280/491 B |
| 3,455,574 | 7/1969 | Priefert | 280/491 B |

*Primary Examiner*—John A. Pekar
*Attorney, Agent, or Firm*—Donald J. Singer; Arsen Tashjian

[57] ABSTRACT

A combination push and tow bar/hitch assembly including a pair of spaced apart parallel outwardly extending mounting bars pivotally attached at their lower ends to the front frame of a motor vehicle. A first transverse brace member is positioned between the mounting bars near the center point and a second transverse brace member is positioned between the outer ends of the mounting bars. A U-shaped frame with a coupler at its apex is pivotably attached to the second transverse brace for use when the bar/hitch is in the horizontal towing position. A ball mounted at the midpoint of the first transverse brace is engaged by the coupler on the U-shaped frame to lock down the frame when the bar/hitch is upward in the push position.

2 Claims, 2 Drawing Figures

COMBINATION PUSH AND TOW BAR

STATEMENT OF GOVERNMENT INTEREST

The invention described herein may be manufactured and used by or for the Government for governmental purposes without the payment of any royalty thereon.

BACKGROUND OF THE INVENTION

This invention relates to a combination push and tow bar for attachment to a motor vehicle and, more particularly, the invention is concerned with providing a push-tow device which includes a pair of outwardly extending spaced apart parallel mounting bars pivotably attached at their lower ends to the front of a motor vehicle. Brace members are provided with a pivotable U-frame for converting the device from the push to the tow phase and back again.

Many devices are presently available for coupling two vehicles together for the purpose of towing one of the vehicles. Some of these devices include hitches with frames that pivot downward to the horizontal operating position and upward to the vertical stowage position. Other devices serve as combination grill guard and hitch with the center of the grill guard folding downward to form a towing structure.

Certain probems arise in the prior art devices when the towing structure is folded upward out of the way in the retracted position. In the towing phase, the drawbar must be extended forward in order to provide sufficient clearance between the towing vehicle and the towed vehicle when turning corners or backing into close spaces. Provisions must be made for retracting the drawbar after the towing structure is folded upward so that it will not interfere with the view of the motor vehicle operator while he is driving. This generally requires some complex mechanism for sliding the drawbar in and out and locking it in either position.

Thus, it can be seen that there is a need for a combination push and tow bar and hitch arrangement which can be quickly and easily changed from the tow to the push phase without any special tools being required and without any complex extension and retraction of a drawbar. The hereinafter described invention does provide a combination push and tow bar which includes a pivotable U-shaped frame portion having a coupler which engages a ball on a brace member so that it can be compactly folded without the use of any special tools when it is in the upright, vertical push and/or storage position.

SUMMARY OF THE INVENTION

The present invention is concerned with providing a combination push and tow bar wherein a pair of spaced apart parallel bars are pivotably attached at their lower ends to fittings engaging the front frame of a vehicle. A pair of transverse braces are positioned between the parallel bars, one at the outer ends and the other intermediate the ends with a ball at the midpoint of the intermediate transverse brace. A pivoting U-shaped frame mounted on the outer transverse brace incudes a coupler at the apex thereof for locking engagement with the ball on the intermediate transverse brace when the device is vertical in the upward push phase and for engaging a towing vehicle when the device is in the downward horizontal position.

Accordingly, it is an object of the invention to provide a combination push and tow bar/hitch which operates as a tow bar as well as a push bar while mounted on the vehicle at all times.

Another object of the invention is to provide a combination push and tow bar wherein a minimum of adjustments are required to change the device from a push bar to a tow hitch at any time either function is desired.

Still another object of the invention is to provide a combination push and tow bar wherein only one driver is required when operated in the towing phase so that a single driver can take two vehicles to their destination.

A further object of the invention is to provide a combination push and tow bar wherein a vehicle which is operated over rough terrain can be either towed or used for pushing in an emergency situation.

A still further object of the invention is to provide a combination push and tow bar wherein a ball mounted on a transverse brace member in conjunction with a coupler on a pivotably mounted U-shaped frame member serves to hold the device in a folded vertical position when not in use as a tow bar.

These and other objects, features and advantages will become more apparent after considering the following detailed description taken in conjunction with the annexed drawings and appended claims.

DESCRIPTION OF A PREFERRED EMBODIMENT

Figure 1:
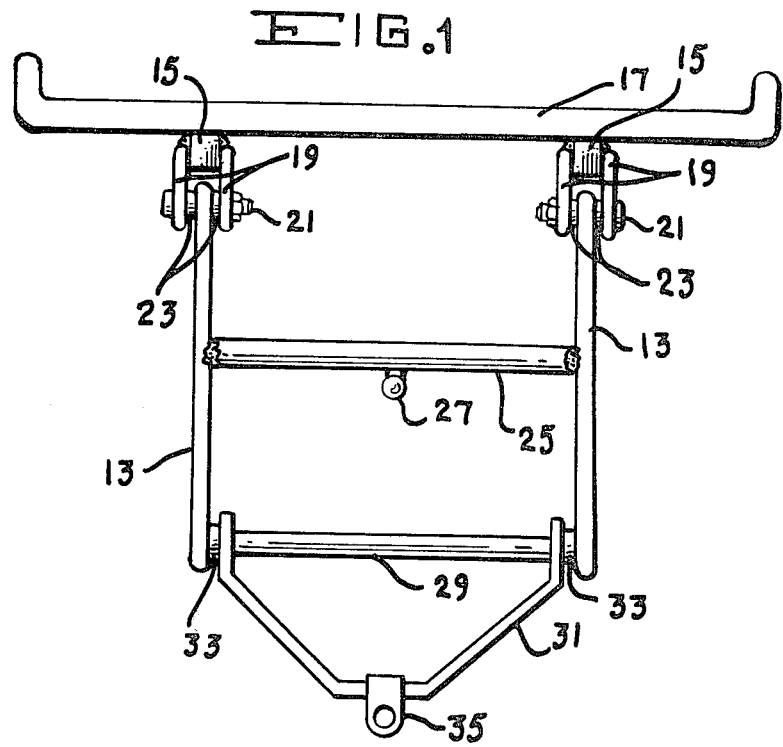
FIG. 1 is a top view of the combination push and tow bar according to the invention shown attached to a vehicle in the horizontal towing position with the U-frame extended forward for attachment to another vehicle.

Referring now to the Figures in which like reference numerals refer to like elements in the two views, in FIG. 1 there is shown a top view of the combination push and tow bar in the horizontal position which is used when it is necessary to tow the vehicle to which the device is attached. The combination push and tow bar according to the invention includes a pair of spaced apart parallel outwardly extending mounting bars 13 pivotably attached at their lower ends to the vehicle by means of the bracket 15 attached to the frame of the vehicle (not shown) under the front bumper 17 with side members 19 fixed to bracket 15 and extending forward therefrom. A pivot pin 21 passes through the side members 19 and through an aligned hole in the lower end of the mounting bars 13. A series of washers 23 are positioned between the side members 19 and the mounting bars 13 to reduce friction and allow free and easy pivoting movement of the device while making the change to the push and/or towing modes.

Figure 2:
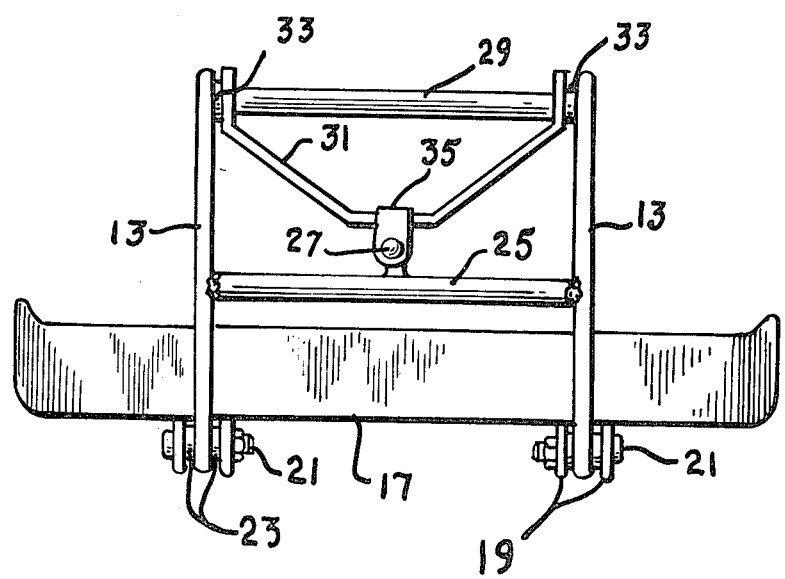
FIG. 2 is a front view of the combination push and tow bar according to the invention shown pivoted upward in the vertical push position with the U-frame in the locked down mode for use in pushing a second vehicle.

Approximately half way outward or upward from the inner or lower ends of the mounting bars 13, there is located a first transverse brace member 25 which serves both as a support brace and as a means for holding a coupling ball 27 which is fixedly attached to the transverse brace at the midpoint between the mounting bars 13. A second transverse brace member 29 is positioned between the outer or upper ends of the mounting bars 13 and serves as both a support brace and a pivot axle around which the U-frame 31 can rotate. Friction reducing washers 33 are provided between the U-frame 31 and the mounting bars 13. At the apex outermost end (in the towing mode) of U-frame 31 there is affixed a coupler 35 for engagement with a ball on another vehicle which could be used to tow the vehicle on which the present invention is installed. The coupler 35 is also used to engage the ball 27 on the midpoint of the first transverse brace 25, as shown in FIG. 2, when the device is in the upward position and the U-frame 31 is locked downward so that the device can be used to push another vehicle.

Thus, it can be seen that the hereinbefore described invention provides a combination push and tow bar arrangement which can be adjusted so that it can be used to tow as well as push by making a few simple adjustments. Those presently on the market can be used only for pushing and contain no other adjustments. In operation, the pivotable U-frame is unlocked by disconnecting the coupler 35 from the ball 27 and pivoted upward. The entire device is then swung downward about the pivot pin 21 on the side members 19 into a substantially horizontal towing position whereby it may be engaged with a towing vehicle.

Although the invention has been illustrated in the foregoing specification in terms of a preferred embodiment thereof, the invention is not limited to this embodiment or to the particular configuration shown and described. It will be apparent to those skilled in the art that certain changes, modifications and substitutions can be made with respect to the shape of the elements without departing from the true spirit and scope of the appended claims. It can be seen that the invention may be used in conjunction with any towing vehicle which is equipped with a ball type trailer hitch attached to the rear frame or bumper.

Having thus set forth the nature of my invention, what I claim as new and desire to secure by Letters Patent of the United States is:

1. A combination push and tow bar for attachment to the front of a carrying vehicle comprising, a pair of mounting bars extending outwardly and upwardly from the front of the vehicle, said mounting bars being spaced apart in parallel relationship, means for pivotably attaching said mounting bars to the front of the vehicle, a first transverse brace member positioned between said mounting bars approximately half-way along the length thereof, a second transverse brace member positioned between said mounting bars at the outer ends thereof, a U-frame pivotably attached to said second transverse brace member at the outer ends of said mounting bars, a coupler attached to the outer apex of said U-frame for engagement with a ball on another vehicle, and a ball fixedly attached to said first transverse brace at the midpoint thereof, said coupler on said U-frame engaging said ball on said first transverse brace for locking said U-frame in the downward position when said push and tow bar with said mounting bars upwardly oriented is in the push mode of operation and not in engagement with a towing vehicle.

2. The combination push and tow bar defined in claim 1 wherein said means for pivotably attaching said mounting bars to the front of the vehicle include a pair of brackets fixedly attached to the frame of the vehicle near the front bumper, side member attached to each of said brackets and extending forward therefrom, and a pivot pin passing through said side members and through an aligned opening in said mounting bar which is positioned between said side members allowing said mounting bar to pivot upward and downward about said pivot pin.

* * * * *